United States Patent Office 3,234,192
Patented Feb. 8, 1966

3,234,192
METHYL-α-CHLOROACRYLATE-TRIALLYL
PHOSPHATE COPOLYMERS
Harry D. Anspon, Kansas City, Mo., assignor to General Aniline & Film Corporation, New York, N.Y., a corporation of Delaware
No Drawing. Filed May 23, 1962, Ser. No. 196,880
3 Claims. (Cl. 260—86.1)

This invention relates to new and improved copolymers derived from the copolymerization of methyl-α-chloroacrylate and triallyl phosphate.

Methyl-α-chloroacrylate polymer is a well known polymer which has been used primarily as a glazing material because of its outstanding physical and chemical characteristics. The polymer has a high heat distortion temperature, high flexural and tensile strength, excellent craze resistance, low notch sensitivity, unique self-extinguishing characteristics in burning tests, and complete formability. In preparing the polymer for such purposes, and since it is necessary to obtain a product with optical clarity, the monomer is polymerized in casting cells using polished glass plates to effect an optically smooth surface on the polymer sheet. In such polymerization processes it has been known that the polymer has a tendency to adhere to the glass plates causing at times delamination of portions of the plastic surface. This has been overcome by incorporating into the monomer a small amount of a silicone oid and/or treating the glass surface to lessen the tendency to adherence of the polymer. While, therefore, it was known that there was some adhesion between the homopolymer and a glass surface, it could not be stated that there was any substantial strength in the bond between the two materials.

It has now been discovered that an outstanding glass adhesive is forthcoming when methyl-α-chloroacrylate is polymerized with a small amount of triallyl phosphate. The adhesion of the resultant copolymer to glass is so great that even pretreatment of the glass with the usual silanes or silicone oils to effect an anti-stick coating thereon does not prevent such an adhesion of the copolymer to the glass that the adhesive bond will not break before delamination of either the glass sheet or the copolymer sheet occurs.

It is therefore an object of the present invention to provide new and useful copolymers of methyl-α-chloroacrylate and triallyl phosphate.

It is still another object of the present invention to provide new and useful copolymers which are outstanding adhesives for glass.

Other objects will appear hereinafter as the description proceeds.

The copolymers of the present invention are prepared by mixing the two monomers in the required proportions and thereafter polymerizing the mass in the usual manner heretofore known for the methyl-α-chloroacrylate homopolymer. To effect polymerization, one may use actinic radiation such as ultra-violet light, or heat for extended periods of time, or a combination of these two. One may also employ a catalyst, and these include the usual peroxide catalysts as well as the ten catalysts which are disclosed in Patent 2,683,705. The preferred peroxide catalyst is ditertiarybutyl peroxide, and the preferred tin catalyst is dibutyl tin diacetate. The triallyl phosphate component comprises a minor amount of the copolymer, and this may vary from about 2% up to about 20%, and preferably from about 5% to about 10%, all on a mole basis. The amount of catalyst is not critical and may vary from about 0.001% to about 2% based on the weight of the monomer used.

The following examples will serve to illustrate the present invention without being deemed limitative thereof. Parts are by weight unless otherwise indicated.

*Example 1*

A charge consisting of 109 g. of triallyl phosphate, 1140 g. of methy-α-chloroacrylate and 0.411 ml. of dibutyl tin diacetate is placed into a 2 liter amber flask equipped with a pouring tube and nozzle. The amount of monomers used is as follows:

5 mole percent triallyl phosphate
95% methyl-α-chloroacrylate

The flask is vigorously shaken and the contents then poured into a 14" x 14" x ⅛" casting cell that has been purged with nitrogen previously and dried at 70° C. The casting cell is constructed with a gasket of sponge rubber covered with a polyethylene terephthalate (polyester) film which has been previously coated with a polyvinyl alcohol solution. The cell is then slowly heated to 120° C. and held for 24 hrs. at about 120° C. At this time the mass has been fully polymerized and attempts to remove the glass plates of the mold are without any success. The adhesion of the glass plates to the copolymer is so great that the glass delaminates upon all attempts to separate it from the copolymer.

*Example 2*

A portion of the copolymer prepared in Example 1 is heated until it flows smoothly. It is then used to coat one surface of two glass plates and the thusly coated surfaces are brought into contact and placed in an oven at 180° C. for 10 minutes. After the laminated assembly has cooled, all attempts to effect delamination of the glass plates fails and the glass is shattered before delamination can be obtained.

*Example 3*

Example 1 is again repeated employing 0.04% ditertiary butyl peroxide. Similar results are again obtained.

*Example 4*

Example 1 is again repeated except that there is added to the charge 0.03% of a phenyl methyl silicone oil as a mold release agent. The same results are obtained as in Example 1.

*Example 5*

Example 1 is again repeated except that the glass plates of the mold are first pretreated with methyltrichlorosilane as a mold release coating. The results are similar to that of Example 1.

*Example 6*

Example 1 is again repeated except that the polymerization is effected by exposure to ultra-violet light from a bank of fluorescent lights for 24 hrs., prior to heating at 120° C. for 24 hrs. The results are the same as in Example 1.

*Example 7*

Example 1 is again repeated except that the polymerization is carried out for 4 hrs. at 60° C. and there results after this time a gel which is then used as in Example 2 to coat one surface of two glass plates which are then laminated together. The laminated assembly is heated for 12 hrs. at 100° C. to complete the copolymerization and curing of the resin. This laminated assembly has similar properties to that of Example 2.

*Example 8*

The previous examples are repeated employing the following mole percents of triallyl phosphate:

(a) 2 mole percent
(b) 8 mole percent
(c) 10 mole percent
(d) 15 mole percent
(e) 20 mole percent In all instances an outstanding glass adhesive results but those containing from 5 to 10 mole percent exhibit excellent adhesion to glass combined with desirable strengths of the bond layer.

While in the above examples the copolymer has been exemplified in its use for adhesion to glass plates, it is clear that the copolymers of this invention may be used to effect adhesion of glass to glass in any physical form of the glass and particularly outstanding results are obtained in the bonding of glass fibers together. It has also been found that outstanding bond strengths may be obtained using the present copolymers between glass and other dissimilar materials such as metals, resins, and the like.

Other variations in and modifications of the desired processes which will be obvious to those skilled in the art can be made in this invention without departing from the scope or spirit thereof.

I claim:
1. A copolymer suitable for the use as glass adhesives and consisting essentially of methyl-$\alpha$-chloroacrylate and from 2 to 20 mole percent of triallyl phosphate, based on the copolymer.
2. A copolymer suitable for the use as glass adhesives and consisting essentially of methyl-$\alpha$-chloroacrylate and from about 5 mole percent to about 10 mole percent triallyl phosphate, based on the copolymer.
3. A copolymer suitable for the use as glass adhesives and consisting essentially of methyl-$\alpha$-chloroacrylate and about 5 mole percent triallyl phosphate, based on the copolymer.

References Cited by the Examiner
UNITED STATES PATENTS

| | | | |
|---|---|---|---|
| 2,626,252 | 1/1953 | Tawney | 260—80 |
| 2,964,488 | 12/1960 | Anspon et al. | 260—89.5 |

JOSEPH L. SCHOFER, *Primary Examiner.*

JOSEPH R. LIBERMAN, *Examiner.*